March 19, 1963 R. W. ISEMAN 3,081,641
GEAR CHANGING MECHANISM FOR BICYCLES AND THE LIKE
Filed March 7, 1960 2 Sheets-Sheet 1
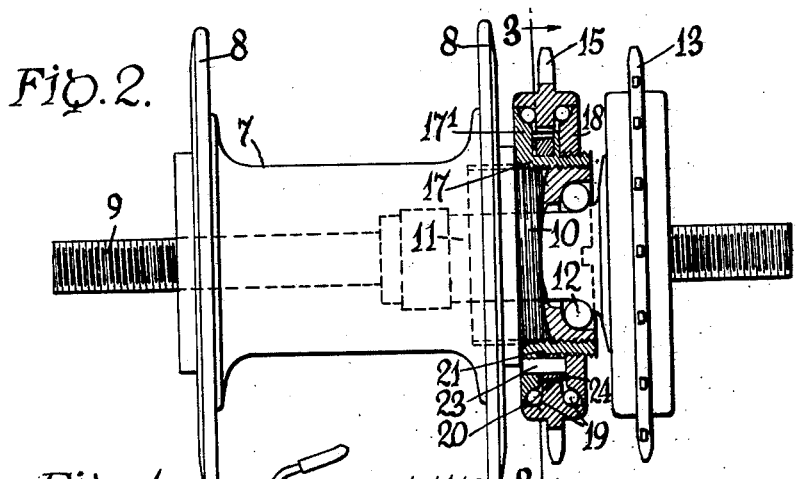
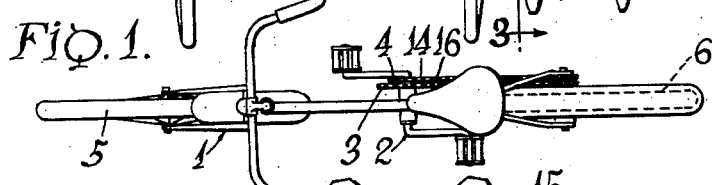
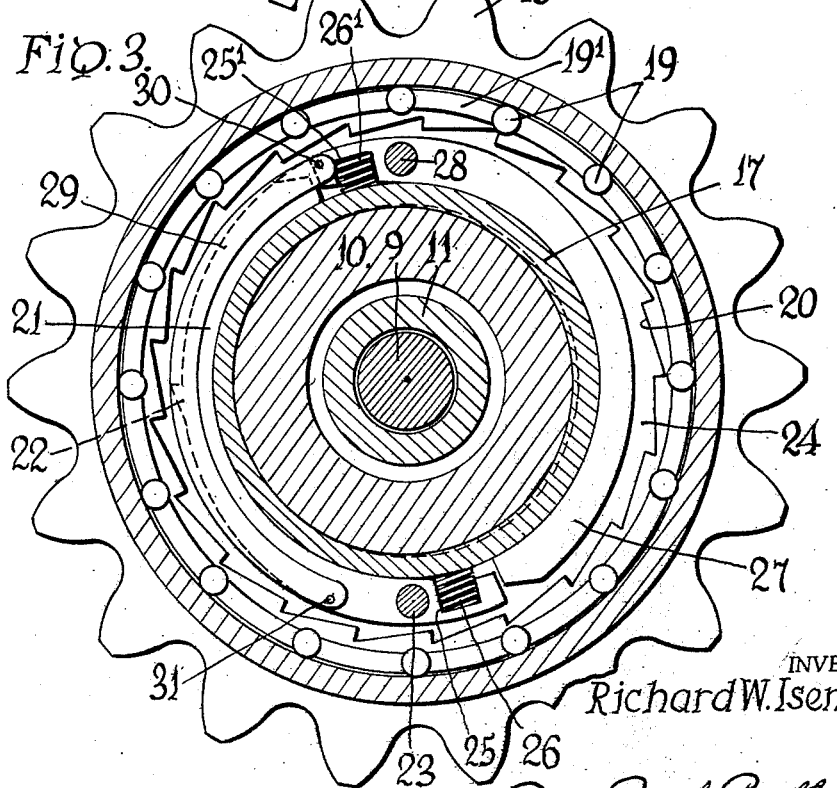
INVENTOR
Richard W. Iseman,
BY Bean, Brooks, Buckley Bean
ATTORNEYS March 19, 1963 R. W. ISEMAN 3,081,641
GEAR CHANGING MECHANISM FOR BICYCLES AND THE LIKE
Filed March 7, 1960 2 Sheets-Sheet 2
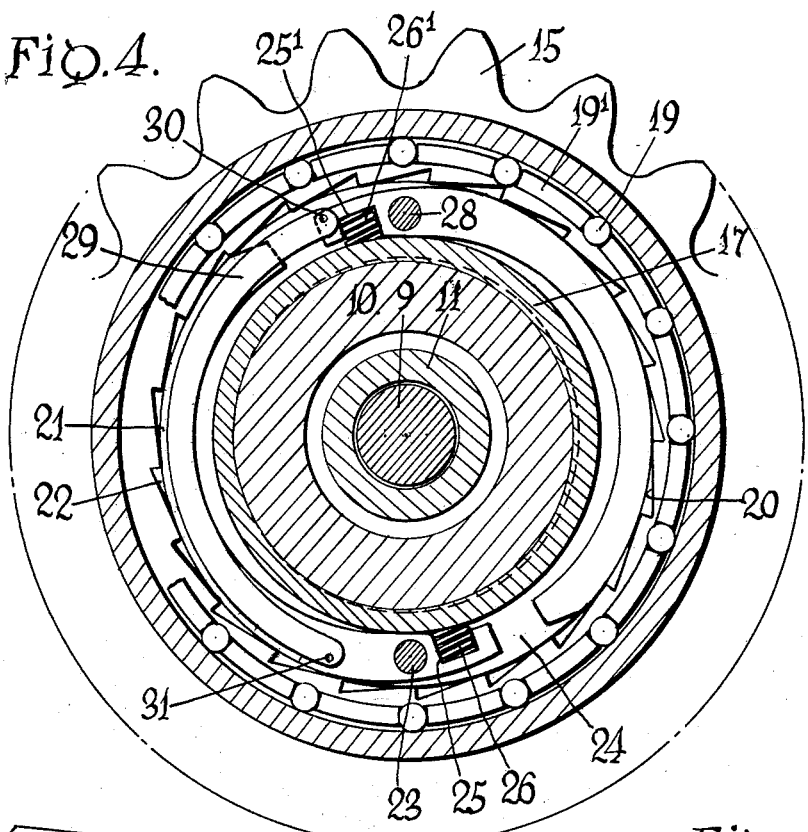
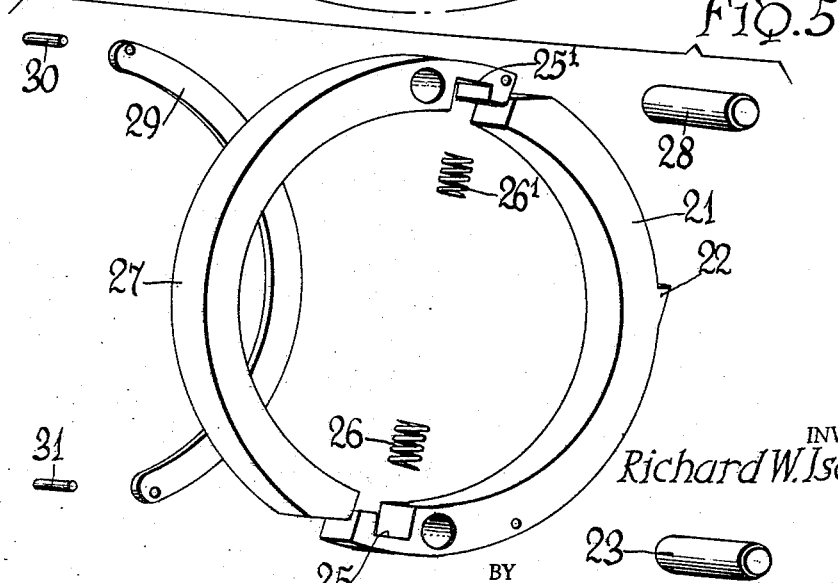
INVENTOR
Richard W. Iseman,
BY
Bean, Brooks, Buckley & Bean ATTORNEYS

United States Patent Office 3,081,641
Patented Mar. 19, 1963

3,081,641
GEAR CHANGING MECHANISM FOR BICYCLES AND THE LIKE
Richard W. Iseman, 1110 Main St., Buffalo, N.Y.
Filed Mar. 7, 1960, Ser. No. 13,005
12 Claims. (Cl. 74—217)

This invention relates to a new and useful drive mechanism for bicycles and the like.

In my Patent 2,690,083, granted September 28, 1954, I disclosed a multi-gear drive arrangement automatically responsive to different speeds for shifting from one gear to another, so that as the speed of the bicycle increases the drive automatically shifts to a higher gear ratio.

The primary object of this invention is to provide a drive gear changing mechanism for bicycles and the like which is operable automatically upon attainment of a predetermined speed of rotation of the traction wheel to shift from one drive gear ratio to another, wherein the shifting mechanism does not use a separate external weight arranged to control a drive pawl, as illustrated in my earlier patent, but is enclosed within the drive gear and protected thereby against damage and dirt accumulations.

Another object of my invention is to provide the foregoing in a simple, relatively inexpensive and highly compact arrangement which is extremely durable and dependable in operation.

In one aspect thereof, a gear change mechanism constructed in accordance with my invention is characterized by the provision of multiple drive members arranged for driving connection with a traction wheel in free wheeling relation thereto, and a ratchet-pawl drive connection between the traction wheel and one of the drive members, the pawl comprising a weight or mass movable relative to the ratchet by centrifugal force generated upon rotation of the traction wheel, whereby shifting from one drive member to another is accomplished automatically upon attainment of a predetermined speed of rotation of the wheel.

The foregoing and other objects, advantages and characterizing features of a gear change mechanism constructed in accordance with my invention will become clearly apparent from the ensuing detailed description of one, presently preferred embodiment thereof, taken in conjunction with the accompanying drawings illustrating the same wherein like reference numerals denote like parts throughout the various views and wherein:

FIG. 1 is a top plan view of a bicycle embodying my invention;

FIG. 2 is a side elevational view of the traction wheel hub and drive sprockets, with parts broken away and others shown in section for greater clarity;

FIG. 3 is a transverse sectional view taken about on line 3—3 of FIG. 2 and showing the gear change mechanism in its disengaged condition;

FIG. 4 is a corresponding view, but showing the gear change mechanism in its engaged position; and FIG. 5 is an exploded perspective view of the gear change mechanism apart from the traction wheel and drive sprocket.

Referring now in detail to the illustrative embodiment of my invention depicted in the accompanying drawings, it will be observed that the same is shown applied to a bicycle, generally designated 1, having a pedal crank 2. A relatively large pedal sprocket 3 and a relatively small pedal sprocket 4 are keyed or otherwise connected to the pedal crank 2. At its forward end the bicycle is provided with the usual wheel 5, and at its rearward end it has a traction wheel 6 mounted on a hub 7 having spoke flanges 8 at opposite sides thereof. Hub 7 is journaled upon an axle 9 by means of ball bearings, not illustrated, which axle is in turn secured to the frame of the bicycle.

The hub 7 is provided at one end with an externally threaded extension 10 secured in rigid relation thereto, and a driver 11, comprising part of a coaster brake mechanism contained within the hub 7 and known per se, is journaled in the extension 10 by the bearings 12 and extends outwardly beyond the extension for mounting a first drive sprocket 13 which is connected to the relatively small pedal sprocket 4 by an endless drive chain 14. A second drive sprocket 15 is connected to the large pedal sprocket 3 by an endless drive chain 16, and is journaled on the hub extension 10 as part of a free wheel transmission having an inner ring 17 threaded on extension 10 and a cover 18 threaded on the inner ring 17, the sprocket 15 being journaled on the ring 17 and cover 18 by ball bearings 19 which are maintained in spaced apart relation by a cage 19'.

Drive sprocket 15 is formed on its inner face with an annular ratchet 20. It is a particular feature of my invention that the ratchet 20 is engaged, to complete the driving connection, by a pawl comprising a centrifugal force responsive mass or weight 21 having a pawl tooth 22. The pawl weight 21 is generally semicircular, so that in its disengaged position shown in FIG. 3 it lies against the bottom wall of the channel between side plate 17' and flange 24 of ring 17, and is pivotally supported adjacent one end by a pin 23 fitted in plate 17' and flange 24. This provides a long lever arm for pivoting outwardly about pivot pin 23 in response to centrifugal force, while leaving space at the pivot end for a recess 25 which receives a spring 26 yieldably urging the pawl weight 21 about its pivot 23 into its disengaged position against the ring 17.

A counter weight 27 is similarly supported in the same channel by a pivot pin 28, and is similar in form to the pawl weight 21 except that it dos not require the pawl tooth 22. A notch or recess 25', receiving a spring 26', is formed in counter weight 27 which is urged about its pivot 28 into position against the inner ring 17 by the spring 26'. The counter weight 27 and the pawl weight 21 are pivotally supported in the inner ring channel in opposed relation, relative to the axle 9, and the two weights are interconnected by a neutralizing arm 29 having pivot connections 30 and 31 with the counter weight 27 and pawl weight 21, respectively, whereby gravitational and other non-centrifugal forces acting on one are counterbalanced by the other. It will be noted that neutralizer arm 29 extends alongside weights 21 and 27, and that all three of these parts are positioned within the inner ring channel.

In operation, the drive sprocket 15 normally is disengaged, as illustrated in FIG. 3, and when the bicycle is first put in motion the driving engagement is with the fixed drive sprocket 13, to provide a low gear ratio giving maximum power. However, as the cycle gains speed, and the traction wheel 6 achieves a speed of rotation such that the centrifugal force on pawl weight 21 and counter weight 27 is sufficient to overcome the springs 26 and 26', the two weights move outwardly in unison until the pawl weight tooth 22 engages the ratchet 20 as illustrated in FIG. 4. At this point the driving connection is transferred from the relatively slowly rotating drive sprocket 13 to the more rapidly rotating drive sprocket 15, and the hub 7 begins to override the drive sprocket 13 through the free wheel connection therewith provided by the coaster brake mechanism. This shift from the lower to the higher gear ratio, for higher speeds of operation with less effort, is accomplished entirely automatically.

When the speed of rotation of the traction wheel slows down to the point where the reduced centrifugal force can no longer overcome the springs 26, 26', the pawl weight tooth 22 is automatically disengaged from the ratchet 20, and the driving connection is transferred to sprocket 13.

The shifting mechanism is entirely automatic, and is contained within the free wheel transmission of drive sprocket 15, whereby there are no exposed parts, such as weights movable along the spokes of the wheel, to be damaged by accidental contact or subject to dirt accumulation. The unit is extremely compact, so as not to detract from the appearance of the bicycle, and comprises a rugged assembly having relatively few parts. The inner surface of the pivot end portions of weights 21 and 27, containing the spring recesses 25, 25' is cut away to accommodate the outward pivoting of the weights, and the outer surface of the long arm of each weight is on a larger radius, to match ratchet 20 when extended.

Of course, where a free wheel coaster brake is not provided, the drive sprocket 13 can contain the usual free wheel mechanism having an annular ratchet and pawls spring urged into engagement therewith. Also, if additional gear ratios are desired, additional transmissions containing the automatic shifting mechanism of my invention and adjusted to respond to different speeds of rotation, can be provided. Such additional transmissions could be placed, for example, on an extension at the opposite end of the hub, and would be connected to additional pedal sprockets.

While I have disclosed in detail only one, presently preferred, illustrative embodiment of my invention, I do not thereby intend that my invention be limited to the details thereof. For example, springs 26 and 26' could comprise rubber cushions. Also, the gear shifting mechanism of my invention might well find utility in other drive arrangements.

Having fully disclosed and completely described my invention, and its mode of operation, what I claim as new is:

1. A driving gear arrangement for bicycles and the like comprising, a pedal crank, a relatively large pedal sprocket and a relatively small pedal sprocket connected to said pedal crank, a traction wheel, a pair of drive sprockets arranged for free wheeling driving connection with said traction wheel, drive means connecting said relatively small pedal sprocket to one of said drive sprockets and connecting said relatively large pedal sprocket to the other of said drive sprockets, a free wheel driving connection between said traction wheel and said one drive sprocket, and means operable automatically upon attainment of a predetermined speed of rotation of said traction wheel to shift the driving connection between said drive sprockets and said traction wheel from said one drive sprocket to said other drive sprocket, said last-named means including a ratchet and pawl driving connection between said traction wheel and said other drive sprocket, wherein said pawl comprises a weight pivotally mounted on said traction wheel for movement into engagement with said ratchet by centrifugal force produced upon rotation of said traction wheel, a counter weight pivotally mounted on said traction wheel in opposition to said pawl weight, means yieldably urging said pawl weight out of engagement with said ratchet, and means interconnecting said pawl weight and said counter weight for movement in unison.

2. In a gear change mechanism for bicycles and the like, a traction wheel having an axle, a drive sprocket carried by said traction wheel, and a ratchet and pawl driving connection between said drive sprocket and said traction wheel, wherein said ratchet is annularly arranged around said axle, and wherein said pawl comprises an elongated weight of generally semi-circular form pivotally mounted on said traction wheel on one side of said axle and movable outwardly into engagement with said ratchet by centrifugal force produced upon rotation of said traction wheel, together with an elongated counter weight of generally semi-circular form pivotally mounted on said traction wheel on the opposite side of said axle, a neutralizing connection between said pawl weight and said counter weight for causing the same to move in unison, and means yieldably urging said pawl and counter weights out of ratchet engaging condition.

3. A gear change mechanism for bicycles and the like as set forth in claim 2, wherein said neutralizing connection comprises an arm pivotally connected adjacent its opposite ends to said pawl and counter weights.

4. A gear change mechanism as set forth in claim 2, wherein said pawl and counter weights are confined within the annulus of said ratchet.

5. A gear change mechanism for bicycles and the like as set forth in claim 2, wherein said weights are mounted to pivot about points adjacent opposed ends thereof, said neutralizing connection comprising an arm of generally semi-circular form on one side of said axle pivotally connected adjacent one of its ends to one of said weights between the pivot point of said one weight and the adjacent end thereof, said neutralizing arm being pivotally connected adjacent the other of its ends to the other of said weights between the pivot point of said other weight and the remote end thereof.

6. A gear change mechanism for bicycles and the like as set forth in claim 2, wherein said last-named means comprise spring means received in a recess in one of said weights between its pivot point and the adjacent end thereof.

7. A gear change mechanism for bicycles and the like as set forth in claim 2, wherein said weights are pivotally mounted adjacent opposed ends thereof, and wherein the outer sides of said weights have a radius of curvature greater than the inner sides thereof to conform to said ratchet when in ratchet engaging condition.

8. In a gear change mechanism for bicycles and the like, a traction wheel, multiple drive members arranged for driving connection with said traction wheel in free wheeling relation thereto, means for driving said drive members to rotate said traction wheel, and means operable automatically upon attainment of a predetermined speed of rotation of said traction wheel to shift the driving connection between said traction wheel and said drive members from one of said drive members to another thereof, said last-named means including a ratchet and pawl driving connection between said traction wheel and one of said drive members, wherein said pawl comprises a weight pivotally mounted on said traction wheel for movement relative to said ratchet by the centrifugal force produced by rotation of said traction wheel, a counter weight pivotally mounted on said traction wheel in opposition to said pawl weight, and neutralizer means interconnecting said pawl weight and said counter weight for movement in unison, and a free wheel driving connection between said traction wheel and the other of said drive members.

9. In a gear change mechanism for bicycles and the like, a traction wheel, multiple drive members mounted on said traction wheel in free wheeling relation thereto, means for rotating said drive members to in turn rotate said traction wheel, and means operable automatically upon attaining a predetermined speed of rotation of said traction wheel to shift the driving connection between said traction wheel and said drive members from one of said drive members to another thereof, said last-named means including a ratchet and pawl driving connection between said traction wheel and at least one of said drive members, wherein said pawl comprises a weight pivotally mounted on said wheel for movement relative to said ratchet by the centrifugal force produced by rotation of said traction wheel, means yieldably urging said pawl weight into a predetermined position relative to said ratchet, a counter weight pivotally mounted on said wheel in opposition to said pawl weight, and neutralizer means interconnecting said pawl weight and said counter weight for movement in unison, and a free wheel driving connection between said traction wheel and the other of said drive members.

10. In a gear change mechanism for bicycles and the like, a traction wheel, multiple drive members mounted on said wheel for driving connection therewith in free wheeling relation thereto, means for driving said drive members to rotate said traction wheel, and means operable to shift the driving connection between said traction wheel and said drive members from one of said drive members to another thereof automatically upon attaining a predetermined speed of rotation of said traction wheel, said last-named means including a ratchet and pawl driving connection between said traction wheel and one of said drive members, wherein said pawl comprises a weight pivotally mounted on said traction wheel for movement into engagement with said ratchet by the centrifugal force produced by rotation of said traction wheel, means yieldably urging said pawl weight out of engagement with said ratchet, a counter weight pivotally mounted on said traction wheel in opposition to said pawl weight, and means interconnecting said pawl weight and said counter weight for movement in unison, and a free wheel driving connection between said traction wheel and the other of said drive members.

11. A driving gear arrangement for bicycles and the like comprising, a pedal crank, multiple pedal sprockets of different sizes keyed to said pedal crank, a traction wheel, multiple drive sprockets carried by said traction wheel in free wheeling relation thereto, drive means interconnecting said drive sprockets and said pedal sprockets, and means operable automatically upon attainment of a predetermined speed of rotation of said traction wheel to shift the driving connection between said traction wheel and said drive sprockets from one of said drive sprockets to another thereof, said last-named means including a ratchet and pawl driving connection between said traction wheel and at least one of said drive sprockets, wherein said pawl comprises a weight pivotally mounted on said wheel for movement relative thereto into engagement with said ratchet, by the centrifugal force produced by rotation of said traction wheel, means normally urging said pawl weight out of engagement with said ratchet, a counter weight pivotally mounted on said wheel in opposition to said pawl weight, and neutralizer means interconnecting said pawl weight and said counter weight for movement in unison, and a free wheel driving connection between said traction wheel and the other of said drive sprockets.

12. A driving gear arrangement for bicycles and the like as set forth in claim 8, wherein said free wheel driving connection comprises a coaster brake mechanism.

References Cited in the file of this patent

UNITED STATES PATENTS

| | | |
|---|---|---|
| 538,287 | Scobee | Apr. 30, 1895 |
| 603,363 | Ireland | May 3, 1898 |
| 632,627 | Beaumont | Sept. 5, 1899 |
| 2,340,368 | Dodge | Feb. 1, 1944 |
| 2,690,083 | Iseman | Sept. 28, 1954 |
| 2,860,519 | Cavanaugh | Nov. 18, 1958 |
| 2,886,977 | Van Ausdall | May 19, 1959 |
| 2,945,482 | McRae | July 19, 1960 |

FOREIGN PATENTS

| | | |
|---|---|---|
| 15,951 | Great Britain | of 1901 |
| 468,969 | Great Britain | July 16, 1937 |